Mar. 13, 1923.　　　　　　　　　　　　　　　　　1,448,274
J. S. KIRFMAN
KNOCKDOWN STRUCTURE FOR TRELLISES, TREE PROTECTORS, AND THE LIKE
Filed May 8, 1922
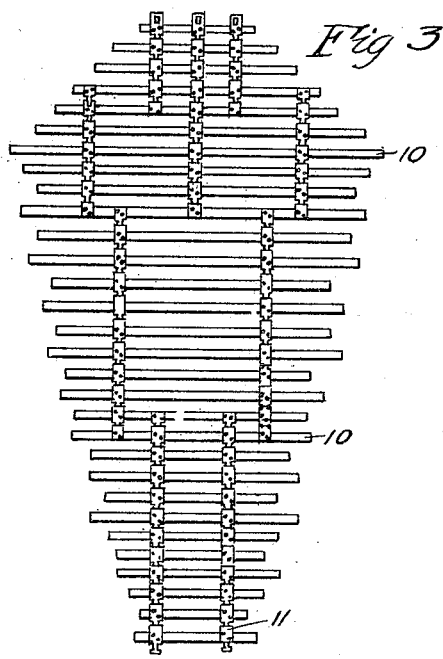
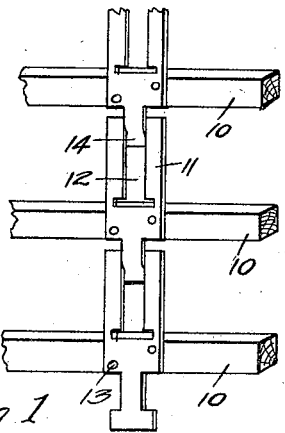
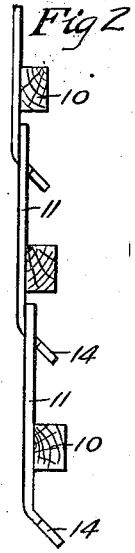
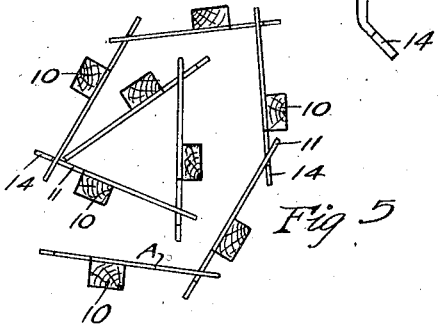
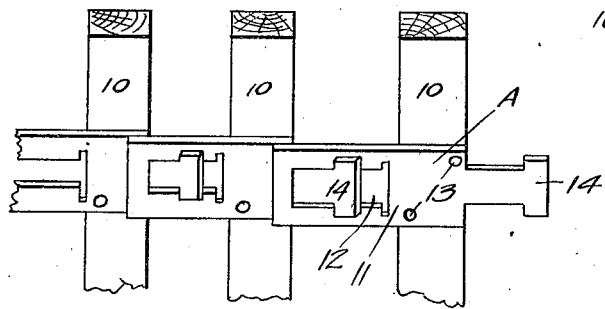
Inventor
John S. Kirfman Patented Mar. 13, 1923.

1,448,274

UNITED STATES PATENT OFFICE.

JOHN S. KIRFMAN, OF DES MOINES, IOWA.

KNOCKDOWN STRUCTURE FOR TRELLISES, TREE PROTECTORS, AND THE LIKE.

Application filed May 8, 1922. Serial No. 559,257.

*To all whom it may concern:*

Be it known that I, JOHN S. KIRFMAN, a citizen of the United States, and a resident of Des Moines, in the county of Polk and State of Iowa, have invented a certain new and useful Knockdown Structure for Trellises, Tree Protectors, and the like, of which the following is a specification.

The object of my invention is to provide a knock down structure for trellises, tree protectors and the like of simple, durable and comparatively inexpensive construction.

More particularly, it is my purpose to provide such a structure composed of units so constructed and arranged that the units may be successively connected together without the use of special tools, nails, screws or separate parts, for forming trellises, tree protectors, garbage can screens, and a great variety of other purposes, which units are so made that the adjustment of the device for this purpose may be readily accomplished.

A further object is to provide such a structure having parts so arranged that the units may be readily and easily separated or, if desired, may be rolled into a roll.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a detail, perspective view of the ends of several units connected together for forming a trellis or the like.

Figure 2 shows an end elevation of the same.

Figure 3 shows a front elevation of a trellis of peculiar style, made from my units.

Figure 4 shows a detailed, perspective view of the ends of several units connected together in a slightly different manner for forming an automatically expansible device; and Figure 5 shows an end view of several of the units connected together and partially rolled into a bundle.

Generally speaking, my invention involves units made of cross bars, indicated generally by the reference character 10, which may be of wood or other material, as desired. The cross bars are horizontal in the trellis and other structures, or may stand upright for making a tree protector or garbage can screen or the like.

For detachably connecting the cross bars successively together, I have provided what I have called connecting devices.

The connecting device, which I have indicated generally by the reference character A, is preferably formed of a strip or plate 11 of metal, which will normally retain its form, and which can readily be bent when desired.

In the strip or plate 11 is a T-shaped slot 12. I preferably secure two of the strips 11 to each bar 10 by means of nails, screws or the like 13, in such manner that the one end of the strip projects from the bar 10, so as to leave the slot 12 entirely clear of the bar.

Projecting from the opposite end of the strip is a T-shaped tongue or the like 14 of such size that the bar of the T may be readily inserted through the side portion of the slot 12 and the shank of the T may readily slide in the narrower portion of the slot 12, as illustrated for instance in Figure 4.

The T-shaped tongues 14 may be inserted in or projected through the slots 12 from opposite sides, depending upon the purpose to which the device is to be put.

The construction of each unit, comprising a bar 10 and two or more of the connecting devices A, is such that a great variety of different devices may be made from the units.

When the bars are used as a tree protector, the connecting device must be bent. When using the device as a garbage can screen, the connecting devices are slightly bent.

The device may be used as supports for climbing flowers or for forming a flower bed fence.

As many of the units may be connected, as is desirable, for the purpose, and by allowing the tongues 14 to stand in different positions with relation to the ends of the slots 12, a self-expanding tree protector may be provided, which may permit the protector to expand, as the tree grows. For instance, a device made as shown in Figure 4, would have considerable expansion before the limit was reached.

In making a trellis, I preferably insert the T-shaped tongues through the slots 12 from the sides opposite the bars 10, as illustrated in Figures 1 and 2, and if the trellis is to hang vertically, with the cross bars horizontal, as shown in Figures 1, 2 and 3, the tongues 14 are preferably bent, as best illustrated perhaps in Figure 2.

The bars 10 may be made of any desired length for the purpose in mind. It will be seen that by varying the length of the bars, as shown for instance in Figure 3, a very artistic trellis can be made.

On account of the peculiar construction of the connecting devices, whereby they can be readily fastened together or disconnected, it will be seen that a trellis of any length or a tree protector of any circumference may easily be made. Endless devices of various shapes can readily be formed.

By bending the connecting devices, any desired shape for the completed structure may be had.

A series of units, when connected together, may be rolled up, as illustrated generally in Figure 5, to a convenient bundle. Figure 5 illustrates the connected units during the beginning of the rolling process.

As a matter of fact, the units can be rolled into a compact, round bundle.

Figure 5 only crudely illustrates the manner of rolling the units into a bundle.

On account of the easy manner in which the units may be connected, the variety of devices, which can be made is very great.

Some changes may be made in the construction and arrangement of the parts of my device without departing from the real spirit of my invention, and it is my intention to cover by my claim, any modified forms of structure or use of mechanical equivalents, which may be reasonably included within its scope.

I claim as my invention:

A knock down structure comprising units, each unit having a bar and a plurality of connecting devices thereon, said connecting devices being formed of metal, capable of being readily bent, each connecting device comprising a plate secured to a bar and having a T-shaped end projecting from the bar in one direction, and a portion projecting in the other direction from the bar, provided with a T-shaped slot.

Des Moines, Iowa, February 1, 1922.

JOHN S. KIRFMAN.